United States Patent [19]

Bott

[11] Patent Number: 4,883,208

[45] Date of Patent: Nov. 28, 1989

[54] VEHICLE DECK RACK WITH POP-UP TIE-DOWNS

[76] Inventor: John A. Bott, 931 Lakeshore Dr., Grosse Pointe Shores, Mich. 48236

[21] Appl. No.: 241,840

[22] Filed: Sep. 6, 1988

Related U.S. Application Data

[63] Continuation of Ser. No. 27,836, Mar. 19, 1987, abandoned.

[51] Int. Cl.$^4$ ............................................... B60R 9/04
[52] U.S. Cl. ........................................ 224/316; 224/324; 224/326; 410/111; 410/112; 296/37.7; 296/1.1
[58] Field of Search ............... 224/309, 316, 321, 322, 224/324–327; 280/769; 296/1 A, 1 S, 76, 37.7, 217, 37.1; 410/101, 102, 104–109, 111–113, 115, 116, 96, 110, 58, 61, 69, 70–74

[56] References Cited

U.S. PATENT DOCUMENTS

| | | | |
|---|---|---|---|
| 3,514,023 | 5/1970 | Russell et al. | 224/316 |
| 3,709,156 | 1/1973 | Bowers | 410/111 |
| 3,831,532 | 8/1974 | Smith | 410/113 X |
| 3,917,213 | 11/1975 | Poehlmann | 410/111 X |
| 4,099,658 | 7/1978 | Bott | 224/326 |
| 4,155,585 | 5/1979 | Bott | 296/1.5 |
| 4,182,471 | 1/1980 | Bott | 224/326 |
| 4,239,139 | 12/1980 | Bott | 224/324 |
| 4,293,159 | 10/1981 | Bott | 296/91 |
| 4,295,587 | 10/1981 | Bott | 224/321 |
| 4,358,037 | 11/1982 | Heideman | 224/321 |
| 4,364,500 | 12/1982 | Bott | 224/325 |
| 4,417,141 | 1/1984 | Bott | 224/326 |
| 4,431,123 | 2/1984 | Bott | 224/321 |
| 4,432,478 | 2/1984 | Bott | 224/321 |
| 4,440,333 | 4/1984 | Bott | 224/324 |
| 4,460,116 | 7/1984 | Bott | 224/321 |
| 4,469,261 | 9/1984 | Stapleton et al. | 224/321 |
| 4,500,020 | 2/1985 | Rasor | 224/321 |
| 4,516,710 | 5/1985 | Bott | 224/324 |
| 4,616,771 | 10/1986 | Heideman | 224/321 |
| 4,684,048 | 8/1987 | Bott | 224/326 |

FOREIGN PATENT DOCUMENTS

| | | | |
|---|---|---|---|
| 2933915 | 3/1981 | Fed. Rep. of Germany | 224/316 |
| 8302831 | 3/1985 | Netherlands | 224/321 |

Primary Examiner—Ernest G. Cusick
Attorney, Agent, or Firm—Harness, Dickey, Pierce

[57] ABSTRACT

An article carrier for a motor vehicle is disclosed. The article carrier includes at least one generally horizontally arranged article supporting slat. The slat includes at one end a tie down mechanism. A wind deflection mechanism is positioned and secured onto the vehicle surface generally perpendicular to the slat. A second tie down mechanism is coupled with the wind deflection mechanism. The second tie down mechanism pivots from a first position to a second position. In the first position, the second tie down mechanism, is positioned within the wind deflection mechanism and has a surface substantially flush with the wind deflection mechanism. In the second position, the second tie down means projects from the wind deflection mechanism to enable ropes, hooked bungee cords, or the like to secure to the second tie down mechanism.

16 Claims, 2 Drawing Sheets

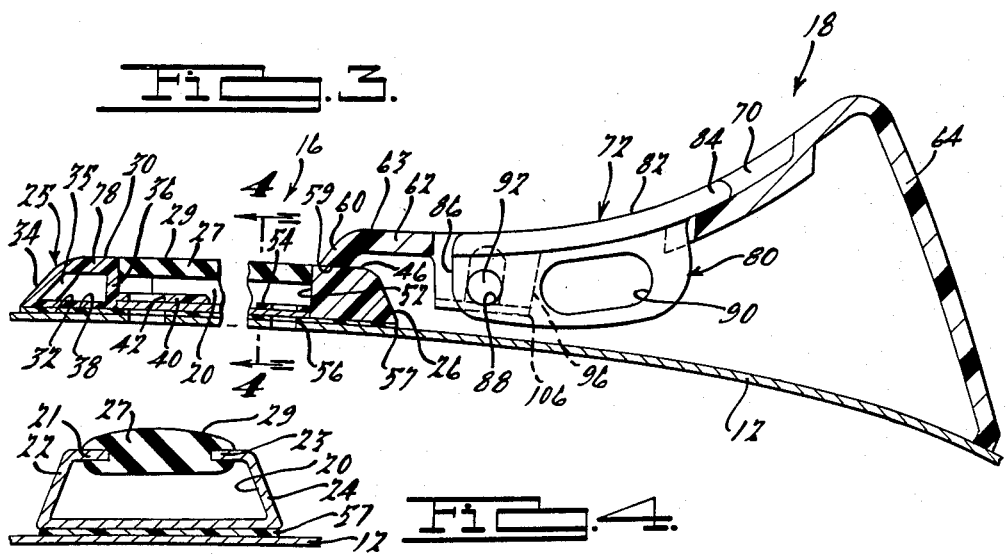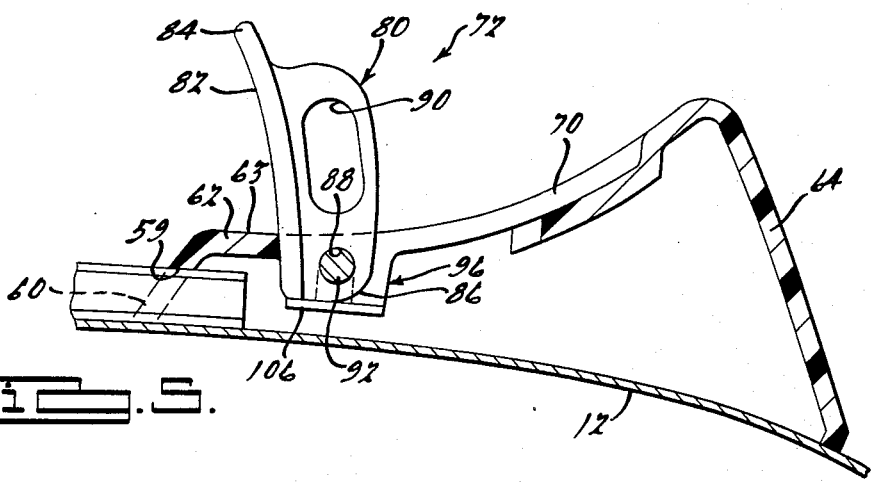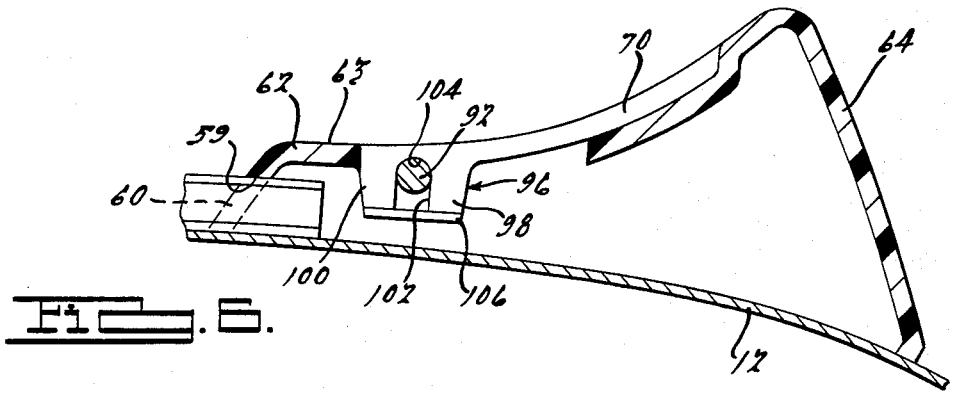

VEHICLE DECK RACK WITH POP-UP TIE-DOWNS

This is a continuation of U.S. patent application Ser. No. 027,836 filed Mar. 19, 1987, now abandoned

BACKGROUND AND SUMMARY OF THE INVENTION

The present invention relates to vehicle article or luggage carriers and, more particularly, to a new and improved vehicle luggage carrier which is securable to the deck lid or a similar horizontally extending plane or surface of a vehicle to secure articles to the carrrier for transportation by the vehicle.

Slat-type luggage carriers such as those disclosed in, for example applicant's prior U.S. Pat. Nos. 4,099,658, 4,182,471, 4,239,139, 4,293,159, 4,295,587, 4,364,500, 4,427,141, 4,440,333, 4,431,123, 4,432,478, 4,460,116 and U.S. patent application No. 672,125, filed November 16, 1984 entitled "Molded Plastic Luggage Carrier Construction" have currently found favor among purshasers of automobiles due to their aesthetically appealing appearance and high degree of functionality as an accessory to carry additional cargo on an automobile vehicle to make the passenger compartment of the vehicle more comfortable for the driver and passengers in that compartment. The luggage carriers of the art comprises a series of low profile metal and plastic slats which reinforce the roof or deck lid, have upper article supporting surfaces to support cargo or luggage spaced from the vehicle surface, and may have additional tie down functions or functions to attach additional accessories to channels within slats fastened thereto by various fastening mechanisms. The slats may also have end caps fastened to the slats, which end caps have either a tie down mechanism, an abutment mechanism, or both. An insert may also be placed in the channel of the metal or plastic slat to provide a resilient member upon which cargo or luggage can be set upon the slats secured to the vehicle.

The present invention improves upon the slat-type luggage carries and provides a slat which includes a tie down mechanism and a wind deflection mechanism such as a spoiler which includes a retractable tie down mechanism. The slat and spoiler are generally manufactured from metallic and plastic materials, respectively. Not only is such a construction an improvement from the standpoint of durability and weight requirements, but also the aesthetic appealability of a luggage carrier can be improved since the plastic may be formed in a much greater variety of shapes and sizes and also, may be provided in a substantial variety of colors. The spoiler, including the retractable tie down mechanisms, may function as either a luggage carrier securement element or as a spoiler when luggage is not present on the carrier.

From the following description taken in conjunction with the accompanying drawings, other objects and advantages of the present invention will become apparent to those skilled in the art.

BRIEF DESCRIPTION OF THE DRAWINGS

FIG. 3 is a cross-section view of FIG. 1 through line 3—3 thereof.

FIG. 4 is a cross-section view of FIG. 3 along line 4—4 thereof.

FIG. 5 is a cross-section view of FIG. 1 along line 5—5 thereof.

FIG. 6 is a cross-section view of FIG. 1 along line 6—6 thereof.

DETAILED DESCRIPTION OF THE PREFERRED EMBODIMENT

Figure 1:
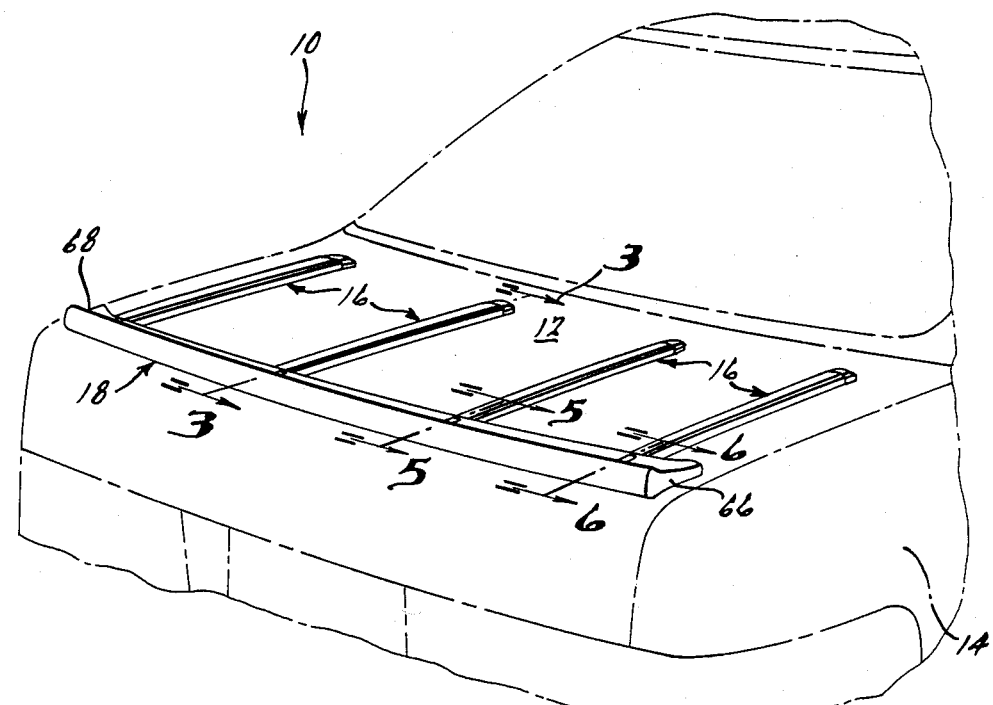
FIG. 1 is a perspective view of a luggage carrier in accordance with the present invention.

Referring to the Figures, a luggage carrier is illustrated and designated with the reference numeral 10. A luggage carrier 10 is positioned on the rear deck lid 12 of a vehicle 14. The luggage carrier 10 includes a series of slats 16 and a wind deflection mechanism such as a spoiler 18 positioned on the vehicle deck lid 12.

The slat elements 16 are generally metallic parts which include a channel 20 formed by two upwardly directed sidewalls 22 and 24 and, optional two flanges 21 and 23 opposing one another, to form the channel 20 as seen in FIGS. 3 and 4. The slat element 16 includes an insert formed tie down 25. The tie down 25 is disposed at one end of the slat element 16 and a closure end insert 26 is disposed at the other end of the slat element 16. The tie down 25 comprises an upper portion 28 which has a configuration matching the upper design configuration of an insert 27 which is placed into the channel 20 of the slat element 16 and having an upper surface 30 co-planar with the upper supporting plane 29 of the insert 27. The tie down 25 further comprises a lower element 32, a vertically extending inclined end element 34 having a pair of wall elements 35, and a vertically extending end closure element 36 which closes off the end of the channel 20. The elements 28, 32, 34, 35 and 36 combine to form a recess 38 whithin which elements, such as ropes, hooked bungee cords, and the like, for tying down articles to be placed on the carrier can be inserted. The end portion 36 includes an extended solid cross sectional portion 40 having a threaded bore 42 (formed either directly with the end portion 36 or provided by means of an insert molded female fastening element [not shown]) therein to mate with a fastener (not shown). At the opposite extreme of the slat element 16 is the closure end insert 26 which has an upper portion having a design mating with the insert 27 and has an upper portion having a desing mating with the insert 27 and has an upper support plane or surface 46 coplaner with the upper support surface 29 of the insert 27. The end insert 26 also includes a vertically disposed end wall 52. Similarly, a solid cross section extended portion 54 having a threaded bore 56 (formed either directly within the end portion 26 or provided by an insert mold nut or the like), within the portion is disposed within the slat element 16 to secure the slat element 16 to the vehicle by means of a suitable fastener. Optionally, a pad 57 may be placed between the slat element 16 and the deck lid 12 as shown to diminish any marring of the painted surfact of the deck lid 12. The closed end 26 abuts the spoiler 18 or may project into an opening 59 in the spoiler 18.

The spoiler 18 is positioned on the vehicle deck lid 12 substantially perpendicular to the slats 16. The spoiler 18 generally includes a first wall 60, including openings 59, abutting the slat end insert 26. The first wall 60 projects substantially perpendicular to the vehicle deck lid 12. A concave arcuate wall 62 having a surface 63 is integral with and projects upward from the wall 60. A second wall 64 is integral with and projects downward from the upper most point of the arcuate wall 62. The second wall 64 is generally aligned with the end of the deck lid 12. The spoiler 18 also includes ends 66 and 68 to enclose the spoiler 18. Generally, the spoiler is a one-piece molded construction manufactured from a polymeric material.

Figure 2:
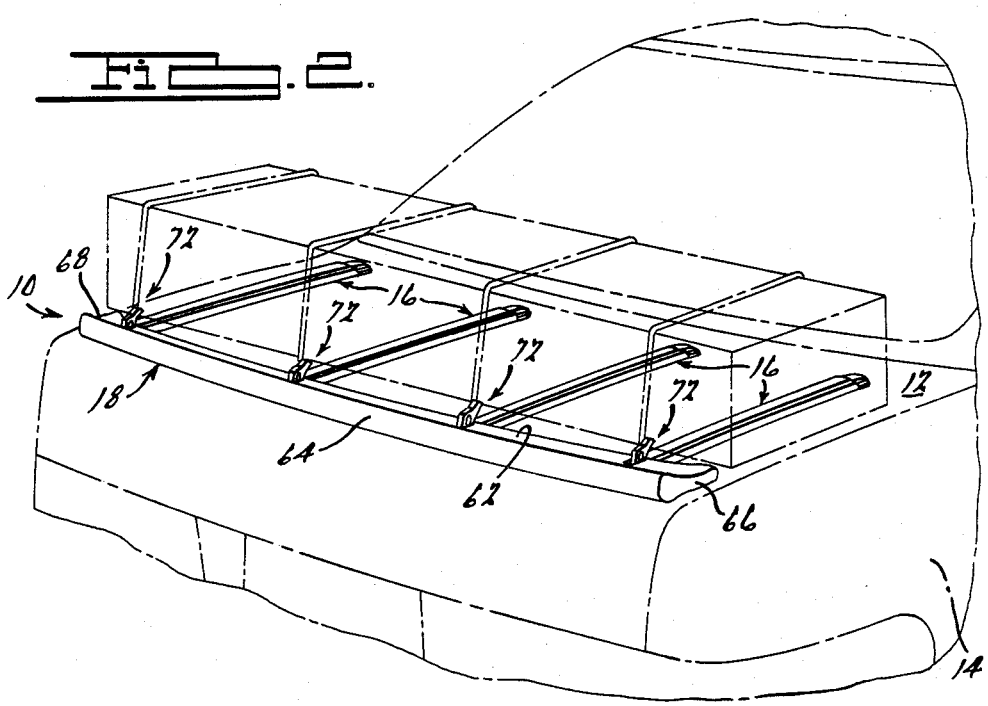
FIG. 2 is a perspective view of a luggage carrier in accordance with the present invention with the retractable tie down mechanisms in an up position.

The spoiler arcuate wall 62 includes openings 70 to couple retractable or pop-up tie down mechanisms 72 with the spoiler 18. The openings 70 are generally positioned adjacent to and are in alignment with the slat elements 16. The tie down mechanisms 72 are secured to the spoiler 18 in openings 70 and pivot from a first position to a second position. In the first position, the tie down mechanisms 72 are non-operable and a surface of the tie down mechanisms 72 is substantially flush with the spoiler arcuate surface 63. In this position, the spoiler 18 has a continuous appearance as seen in FIG. 1. In the second operable position, the tie down mechanisms 72 are substantially perpendicular to the arcuate surface 63 to accept ropes, hooked bungee cords, or the like, to secure articles (shown in phantom in FIG. 2) on the slat elements 16.

The tie down mechanisms 72, as best seen in FIG. 5, generally include an elongated body member 80 having a concave arcuate surface 82. The elongated body member 80 has a tail portion 84 at one end and a curved end portion 86 at the other. Apertures 88 and 90 are formed in the body member 80. The concave arcuate surface 82 has substantially the same curvature as the spoiler arcuate surface 63. Thus, the tie down arcuate surface 82 enables the tie down mechanisms 72 to be substantially flush with the spoiler arcuate surface 62 when the tie down mechanisms 72 are in their first non-operable position. The tail portion 84 enables the body member 80 to be easily manipulated from its first to second position. The aperture 88 is formed in the end portion 86 of the body member 82. The aperture 88 enables a pin 92 to project through the aperture 88 and body member 80 to secure the tie down mechanisms 72 to the spoiler 18. Aperture 90, formed adjacent to the tail 84, enables ropes, hooked bungee cords, or the like, to pass through the aperture 90 to secure luggage or the like onto the slat elements 16.

Turning to FIG. 6, a pin retaining element 96 is shown. The retaining elements 96 are formed on each side of the openings 70. Each slot 102, having an arcuate surface 102, positioned between the wall members 98 and 100. The wall members 98 and 100 are integrally formed with the under surface of the spoiler 18. The pin 92 is positioned through the tie down mechanism aperture 88 and has a portion of the pin 92 projecting out of both sides of the body member 80. The pin 92 is positioned in the slot 102 between wall members 98 and 100 on both sides of the opening 70. A plate member 106 is positioned and secured beneath the wall members 98 and 100 to secure the pin 92 in the slot 102. The pin 96 may nest on the arcuate surface 104 to enable rotation of the tie down mechanism 72 from their first to second position. Also, other retractable tie down mechanisms, like those of U.S. Pat. No. 4,460,116, the specification of which is herein incoporated by reference, may be utilized in the present invention.

While it will be apparent that the preferred embodiment of the invention disclosed is well calculated to fulfill the objects above stated, it will be appreciated that the invention is susceptible to modification, variation and change without departing from the proper scope and fair meaning of the subjoined claims.

I claim:

1. In combination in a vehicle article carrier adapted to be mounted on a planar surface of a motor vehicle comprising:
    one or more article supporting slats adapted to be coupled with the planar surface and arranged substantially parallel to the planar surface, said one or more slats each having two ends, means for tying down articles to be operably associated with one end of each of said one or slats;
    means for deflecting wind, said means for deflecting wind adapted to be associated with the planar surface and oriented substantially transverse to said one or more slats, said wind deflection means forming an opening and having a first upper surface which is arcuate; and
    second means for tying down articles to be carried coupled with said wind deflection means, said second means being disposed in said opening and having a second upper surface substantially the same curvature as said first upper surface, said second means for tying down articles pivoting from a first position, wherein said second upper surface of said second means for tying down articles is substantially flush with said first upper surface of said wind deflection means, to a second position wherein said second means for tying down articles projects from said wind deflection means.

2. An article carrier system in accordance with claim 1, wherein said one or more slats each having a second end projecting into said wind deflection means.

3. In combination in a vehicle article carrier adapted to be mounted on a planar surface of a motor vehicle comprising:
    one or more article supporting slats adapted to be coupled with the planar surface and arranged substantially parallel to the planar surface, said one or more slats each having two ends, means for tying down articles to be carried operably associated with one end of each of said one or more slats;
    means for deflecting wind, said means for deflecting wind adapted to be associated with the planar surface and oriented substantially transverse to said one or more slats; and
    second means for tying down articles to be carried coupled with said wind deflection means, said second means for tying down articles pivoting from a first position, wherein said second means for tying down articles is substantially flush with said wind deflection means, to a second position wherein said second means for tying down articles projects from said wind deflection means;
    said second means for tying down articles including at least one body member having means for enabling pivotal securement to said wind deflection means, said wind deflection means having a wind deflecting surface, each said body member including means for enabling passage of ropes, hooked bungee cords, or the like, for securing articles to be carried on said article carrier, and each said body member including a surface having a shape substantially corresponding to the shape of said wind deflection surface of said wind deflection means such that said wind deflection means has a continuous appearance when said body member is in said first position.

4. An article carrier system in accordance with claim 3, wherein said wind deflection means includes means for securing said second means for tying down articles to said wind deflection means such that said second means for tying down articles, when in said first position, presents said wind deflection means with a continuous appearance.

5. In combination in a vehicle article carrier adapted to be mounted on a planar surface of a motor vehicle. comprising: one or more article supporting slats adapted to be coupled with the planar surface and arranged substantially parallel to the planar surface, said one or more slats each having two ends, means for tying down articles to be carried operably associated with one end of each of said one or more slats;

means for deflecting wind, said means for deflecting wind adapted to be associated with the planar surface and oriented substantially transverse to said one or more slats;

second means for tying down articles to be carried coupled with said wind deflection means, said second means for tying down articles pivoting from a first position, wherein said second means for tying down articles is substantially flush with said wind deflection means, to a second position wherein said second means for tying down articles porjects from said wind deflection means;

said second means for tying down articles including at least one body member having means for enabling pivotal securement to said wind deflection means, said wind deflection means having a wind deflecting surface, each said body member including means for enabling passage of ropes, hooked bungee cords, or the like, for securing articles to be carried on said article carrier, and each said body member including a surface having a shape substantially corresponding to the shape of said wind deflection surface of said wind deflection means such that said wind deflection means has a continuous appearance when said body member is in said first position; and including a plurality of support slats adatped to be mounted on the motor vehicle planar surface and a corresponding number of body members being secured to said wind deflection means.

6. In combination in a vehicle article carrier adapted to be mounted on a planar surface of a motor vehicle comprising:

one or more article supporting slats adapted to be associated with and arranged substantially parallel to the planar surface, each slat having two ends and means for tying down articles to be carried coupled with one end of said one or more slats;

a wind deflecting spoiler adapted to be associated with the planar surface and positined generally perpendicular to said one or more slats, said wind deflecting spoiler having a surface for deflecting wind; and second means for tying down articles to be carried coupled with said spoiler, said second means for tying down articles moving from a first position, wherein said second means for tying down articles is substantially flush with said spoiler surface, to a second position wherein said second means for tying down articles projects from said spoiler surface.

7. An article carrier system in accordance with claim 6, wherein said second means for tying down articles includes at least one body member having means for enabling pivotal securement to said wind deflecting spoiler, each said body member including means for enabling passage of ropes, hooked bungee cords, or the like, for securing articles to be carried on said article carrier, and each said body member including a surface having a shape substantially corresponding to the shape of said spoiler surface such that said wind deflecting spoiler has a continuous appearance when said body member is in said first position.

8. An article carrier system in accordance with claim 6, wherein said wind deflecting spoiler includes means for securing said second means for tying down articles to said wind deflecting spoiler such that said second means for tying down articles, when in said first position, presents a concave arcuate surface with a continuous appearance, on said wind deflecting spoiler.

9. An article carrier system in accordance with claim 6, wherein said one or more slats each having a second end projecting into said wind deflecting spoiler.

10. An article carrier in accordance with claim 7, wherein a plurality of support slats are adapted to be mounted on the motor vehicle planar surface and a corresponding number of body members are secured to said wind deflecting spoiler.

means for deflecting wind, said means for deflecting wind adapted to be associated with said exterior horizontal surface and oriented substantially transverse to the longitudinal axis of the body; and second means for tying down articles to be carried associated with said wind deflection means, said second means for tying down articles moving from a first position wherein said second means for tying down articles is substantially flush with said wind deflection means, to a second positin wherein said second means for tying down articles projects from said wind deflection means.

11. An article carrier system for supporting and securing articles on a generally horizontally extending exterior body surface of a vehicle, comprising one or more elongated slats on said surface, each slat having a forward end and a rearward end, means for tying down articles to be carried operably associated with said forward end of said one or more slats:

means for deflecting wind, said means for deflecting wind adatped to be associated with said surface and oriented substantially transverse to said one or more slats at the reaward end of said one or more slats, said wind deflection means including means forming an opening and having a first upper surface which is arcuate; and second means for tying down articles to be carried coupled with said wind deflection means, said second means being disposed in said opening and having a second upper surface substantially the same curvature as said first upper surface, said second means for tying down articles moving from a first position wherein said second upper surface of said second means for tying down articles is substantially flush with said first upper surface of said wind deflection means, to a second position wherein said second means for tying down articles projects from said wind deflection means.

12. An article carrier for a vehicle including one or more slats fixedly secured on a generally horizontally extending exterior vehicle body surface:

said one or more slats having two ends;

means for tying down articles to be carried operably associated with one end of each of said one or more slats;

means for deflecting wind, said means for deflecting wind adatped to be associated with said exterior vehicle body surface and positioned substantially transverse to said one or more slats, said wind deflection means including means forming an opening and having a first upper surface which is arcuate; and second means for tying down articles to be carried associated with said wind deflection means, said second means being disposed in said opening and having a second upper surface substantially the same curvature as said first upper surface, said second means for tying down articles moving from a first position, wherein said second upper surface of said second means for tying down articles is substantially flush with said first upper surface of said wind deflection means, to a second position wherein said second means for tying down articles projects from said wind deflection means.

13. In a vehicle having a body with an exterior horizontal surface such as a trunk lid or a roof, an article carrier system for supporting and securing articles on said exterior surface comprising:

one or more elongated slat-like elements on said surface extending substantially parallel to the longitudinal axis of the body;

said one or more slat-like elements having two ends;

means for tying down articles to be carried operably associated with one end of said one or more slat-like elements;

means for deflecting wind, said means for deflecting wind adapted to be associated with said exterior horizontal surface and oriented substantially transverse to the longitudinal axis of the body, said wind deflection means including means forming an opening and having a first upper surface which is arcuate; and second means for tying down articles to be carried associated with said wind deflection means, said second means being disposed in said opening and having a second upper surface substantially the same curvature as said first upper surface, said second means for tying down articles moving from a first position wherein said second upper surface of said second means for tying down articles is substantially flush with said first upper surface of said wind deflection means, to a second position wherein said second means for tying down articles projects from said wind deflection means.

14. An article carrier system for supporting and securing articles on a generally horizontally extending exterior body surface of a vehicle, comprising one or more elongated slat-like elements on said surface, each slat-like element having two ends, means for tying down articles to be carried operably associated with one end of said one or more slat-like elements:

wind deflecting spoiler adatped to be associated with said surface and positioned substantially perpendicular to said one or more slat-like elements;

said wind deflecting spoiler having a surface for deflecting wind; and second means for tying down articles to be carried coupled with said wind deflecting spoiler, said second means for tying down articles moving from a first position wherein said second means for tying down articles is substantially flush with said spoiler surface, to a second position wherein said second means for tying down articles projects from said spoiler surface.

15. An article carrier for a vehicle including one or more slats fixedly secured on a generally horizontally extending exterior vehicle body surface:

said one or more slats each having a forward end and a reaward end as mounted on said body surface;

means for tying down articles to be carried operably associated with the forward end of each of said one or more slats;

a wind deflecting spoiler adapted to be associated with said exterior vehicle body surface, positioned generally perpendicular to said one or more slats and associated with the rearward end of each of said one or more slats, said wind deflecting spoiler having a surface for deflecting wind; and second means for tying down articles to be carried associated with said wind deflecting spoiler, said second means for tying down articles moving from a first position, wherein said second means for tying down articles is substantially flush with said spoiler surface, to a second position wherein said second means for tying down articles projects from said spoiler surface.

16. In a vehicle having a body with an exterior horizontal surface such as a trunk lid or a roof, an article carrier system for supporting and securing articles on said exterior surface comprising:

one or more elongated slats on said surface extending substantially parllel to the longitudinal axis of the body;

said one or more slats having two ends;

means for tying down articles to be carried operably associated with one end of said one or more slats;

a wind deflecting spoiler adapted to be associated with said exterior horizontal surface and positioned generally perpendicular to the longitudinal axis of the body; and second means for tying down articles to be carried associated with said wind deflecting spoiler, said second means for tying down articles moving from a first position wherein said second means for tying down articles is substantially flush with said spoiler surface, to a second position wherein said second means for tying down articles projects from said spoiler surface.

* * * * *

UNITED STATES PATENT AND TRADEMARK OFFICE
CERTIFICATE OF CORRECTION

PATENT NO. : 4,883,208

DATED : November 28, 1989

INVENTOR(S) : John A. Bott

It is certified that error appears in the above-identified patent and that said Letters Patent is hereby corrected as shown below:

Title page, References Cited, U.S. PATENT DOCUMENTS, "4,417,141" should be --4,427,141--;

Col. 1, Line 34, insert "the" after --within--;

Col. 1, Line 42, "carries" should be --carriers--;

Col. 2, Line 36, "whithin" should be --within--;

Col. 2, Lines 46-48, delete "has an upper portion having a desing mating with the insert 27 and" after --and--;

Col. 3, Line 48, insert "retaining element 96 includes a pair of wall members 98 and 100 and a" after --Each--;

Col. 3, Line 60, "mechanism" should be --mechanisms--;

Col. 3, Line 63, "incoporated" should be --incorporated--;

Col. 4, Line 11, Claim 1, insert "carried" after --be--;

Col. 4, Line 12, Claim 1, insert "more" after --or--;

Col. 5, Line 9, Claim 5, delete "." after --vehicle--;

Col. 5, Line 26, Claim 5, "porjects" should be --projects--;

Col. 5, Line 42, Claim 5, "adatped" should be --adapted--;

Col. 5, Line 55, Claim 6, "positined" should be --positioned--;

UNITED STATES PATENT AND TRADEMARK OFFICE
CERTIFICATE OF CORRECTION

Page 2 of 2

PATENT NO. : 4,883,208

DATED : November 28, 1989

INVENTOR(S) : John A. Bott

It is certified that error appears in the above-identified patent and that said Letters Patent is hereby corrected as shown below:

Col. 6, Lines 26-37, Claim 10, after "spoiler." delete the next two paragraphs;

Col. 6, Line 47, Claim 11, "adatped" should be --adapted--;

Col. 7, Line 5, Claim 12, "adatped" should be --adapted--;

Col. 8, Line 3, Claim 14, "adatped" should be --adapted--;

Col. 8, Line 20, Claim 15, "reaward" should be --rearward--;

Col. 8, Line 43, Claim 16, "parllel" should be --parallel--.

Signed and Sealed this

Nineteenth Day of February, 1991

Attest:

HARRY F. MANBECK, JR.

*Attesting Officer*  *Commissioner of Patents and Trademarks*